United States Patent [19]

Stockell et al.

[11] Patent Number: 5,046,774
[45] Date of Patent: Sep. 10, 1991

[54] DEBRIS CATCHER

[76] Inventors: Sean D. Stockell, 10825 Watson Rd., Sunset Hills, Mo. 63127; Donald M. Stockell, 5701 Horneker Rd., Pacific, Mo. 63069

[21] Appl. No.: 418,673

[22] Filed: Oct. 10, 1989

[51] Int. Cl.$^5$ .............................. B60P 1/28
[52] U.S. Cl. ............................ 296/38; 298/38; 222/108
[58] Field of Search .............. 296/38; 104/133; 298/1 R, 38; 222/108; 239/121, 122

[56] References Cited

U.S. PATENT DOCUMENTS

| | | | |
|---|---|---|---|
| 2,679,335 | 5/1954 | Bell | 222/108 |
| 2,682,975 | 7/1954 | Stoner | 222/108 |
| 4,772,072 | 9/1988 | Vick, Jr. | 296/38 X |
| 4,772,075 | 10/1988 | Vick, Jr. | 298/7 |

Primary Examiner—Margaret A. Focarino
Assistant Examiner—Joseph D. Pape
Attorney, Agent, or Firm—Heller & Kepler

[57] ABSTRACT

A catching device for attachment to the rear of a truck or truck bed preferably for a dump truck arrangement, has a sheet member having attachment and fastening portions which, when suitably applied to the rear of the truck bed, generally prevents debris, rocks, stones, pebbles and the like from falling off a rear lip, shelf, or other truck bed structure upon which debris may accumulate, or for collecting debris that slips through the gap between the tail gate and onto the road or pour plate.

18 Claims, 3 Drawing Sheets

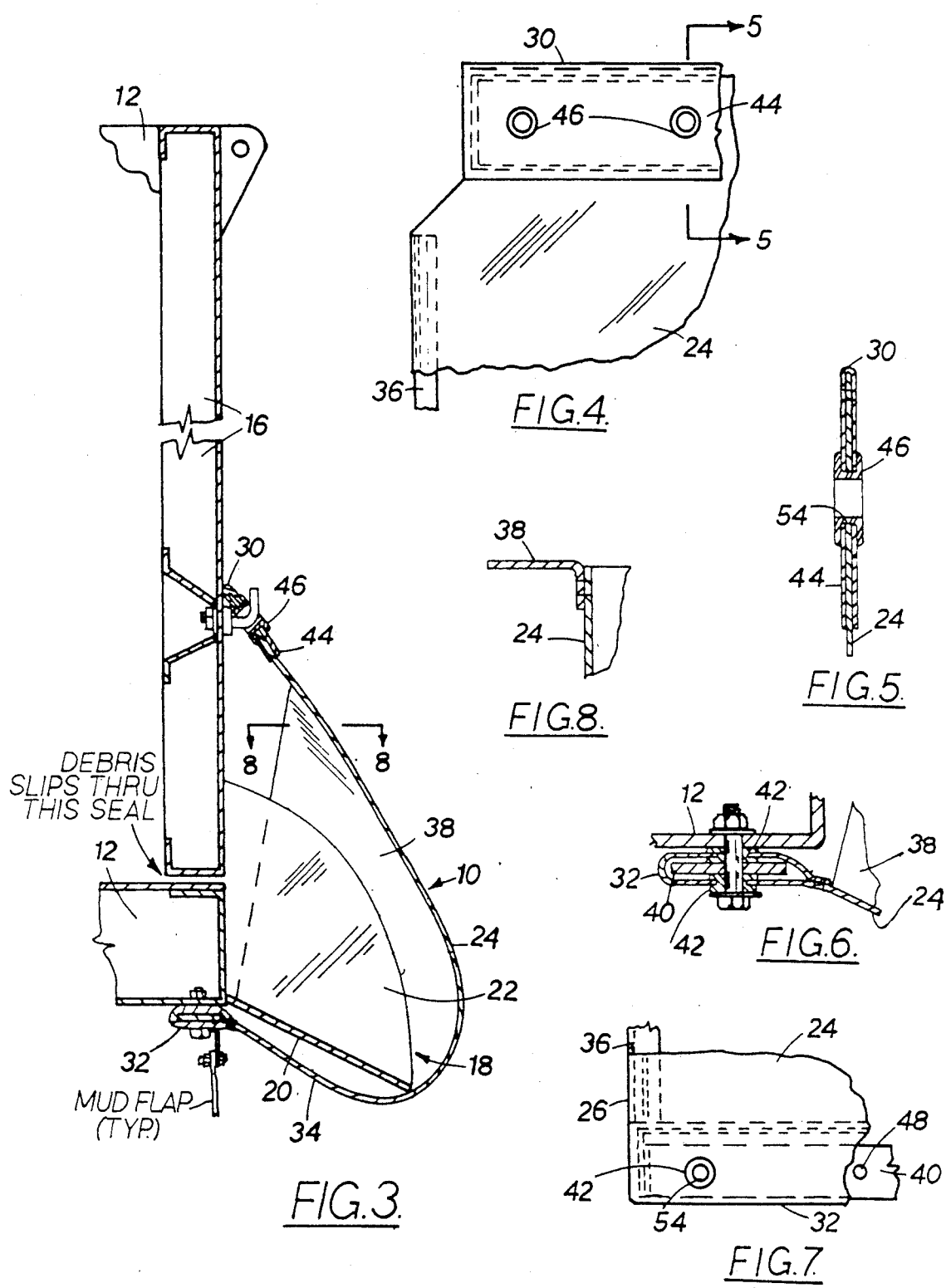

DEBRIS CATCHER

BACKGROUND OF THE INVENTION

The present invention relates in general to preventing debris, rocks, stones, pebbles and the like from falling off a truck and possibly creating an unsafe road condition, more particularly, to a catching device for attachment to the rear of a truck. The catcher of this invention is an improvement over the conventional tarp and diverters found on trucks and particularly dump trucks.

With the conventional devices, a truck, for example, a dump truck, typically carries a tarp for covering whatever is being hauled in the truck bed. A tarp is a best only marginally effective. Conventional tarpaulin covers primarily keep down dust and are not particularly effective to keep even small stones or pebbles from falling out or being tossed out of the truck bed onto the road or highway.

Another drawback associated with present truck and particularly dump truck design is the addition of a funnel, diverter or pour plate attached at the rear of the truck bed and used to direct whatever is being removed from the truck bed into the desired area. These devices also provide a conduit to direct any debris on the rear of the truck directly onto the roadway and into the path of any following vehicle.

Accordingly, it is an object of the present invention to provide a debris catcher that is adapted for attachment to the rear of a truck. With the debris catcher of this invention it is expected that stones, pebbles, and other debris remaining on a rear portion of the truck bed or slipping or falling through the lift gate seal will be captured and kept from falling onto the road surface.

Another object of the present invention is to provide a debris catcher that is constructed to provide a relatively standard device that can be applied to a variety of truck and truck bed designs.

A further object of the present invention is to provide a debris catcher that is adapted to collect a substantial portion of any debris left on the exterior truck bed structure as the truck is driven from one location to another.

Still another object of the present invention is to provide a debris catcher that may be readily emptied by the truck operator. The debris catcher of this invention is preferably unfastened from the truck tail gate and the collected debris allowed to spill out.

Still a further object of the present invention is to provide a debris catcher that can be easily removed and replaced. The basic construction of this invention is adapted to make it easy for the truck owner or operator to replace the catcher before it completely wears out or is otherwise rendered useless.

SUMMARY OF THE INVENTION

To accomplish the foregoing and other objects of the invention there is provided a debris catcher for preventing debris, rocks, stones, pebbles and the like from falling from a truck and possibly creating an unsafe road condition by providing a catching device for attachment to the rear of a truck or truck bed. The debris catcher comprises a debris collecting means associated with means for attaching the collection means to the truck and providing a detachable fastening means for emptying the debris from the collection means.

The fastening and attaching means cooperate to form the collecting means or portion of the debris catcher. The debris catcher may also include side members for further confining the debris to the catcher. The attachment and fastening portions may be reinforced to better withstand the weight of the collected debris and the jarring and shaking associated with the vehicle as it is loaded, unloaded, and as it travels between locations.

The debris catcher of this invention is preferably constructed from a sheet member with opposing side portions, a top portion and a bottom portion.

These and other objects and features of the present invention will be better understood and appreciated from the following detailed description of embodiments thereof, selected for purposes of illustration and shown in the accompanying drawings.

BRIEF DESCRIPTION OF THE DRAWINGS

FIG. 3 is a side elevation view of the debris catcher depicted in FIG. 1;

FIG. 4 is a partial elevation view;

FIG. 5 is a sectional view taken along line 5—5 in FIG. 4;

FIG. 6 is an enlarged detail view of the attachment of the debris catcher to a dump truck body;

FIG. 7 is a partial elevation view of a lower reinforcing bar detail;

FIG. 8 is a sectional view of taken along line 8—8 in FIG. 3;

FIG. 11B is a sectional view taken along line B—B in FIG. 11A.

DETAILED DESCRIPTION

Figure 1:
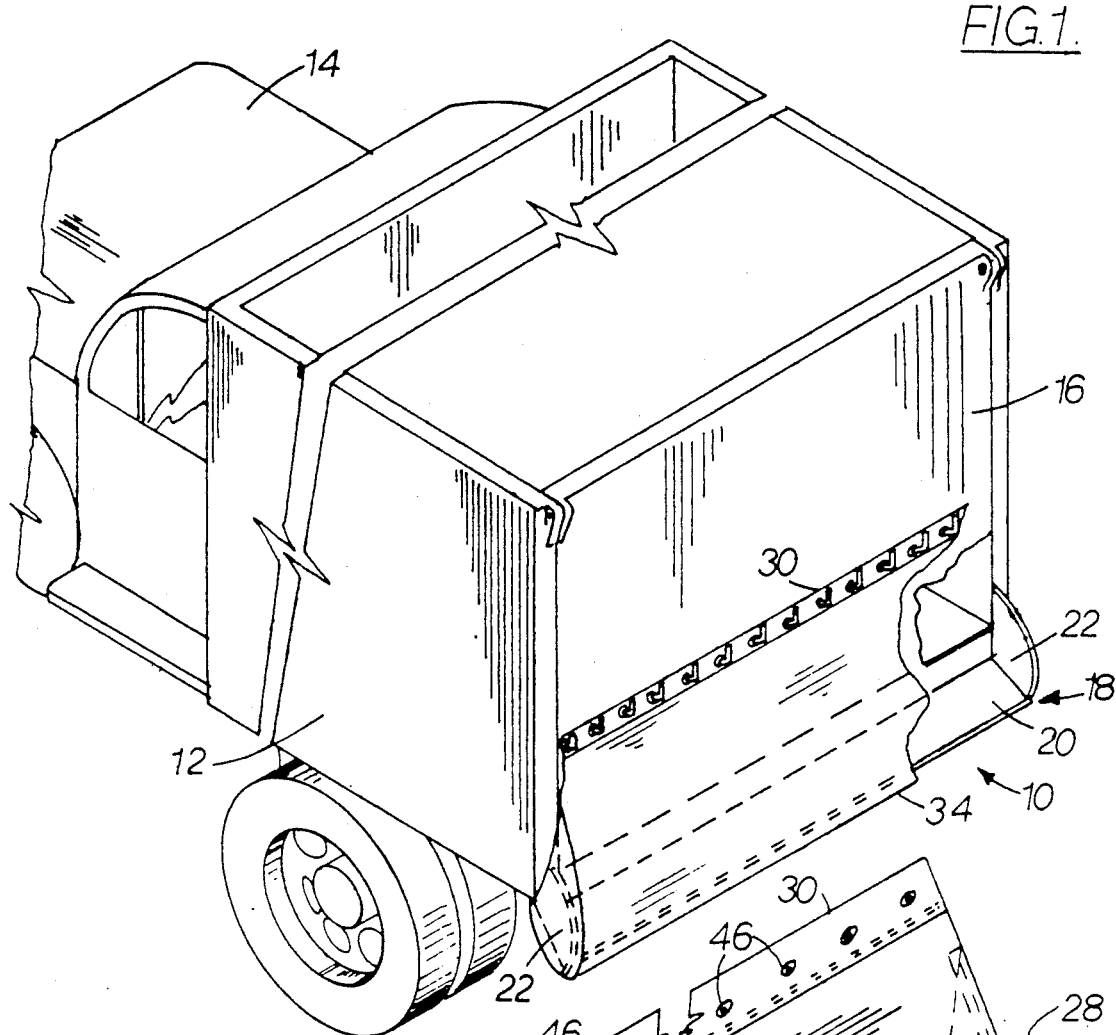
FIG. 1 is a perspective view of a debris catcher constructed in accordance with the present invention.
Figure 2:
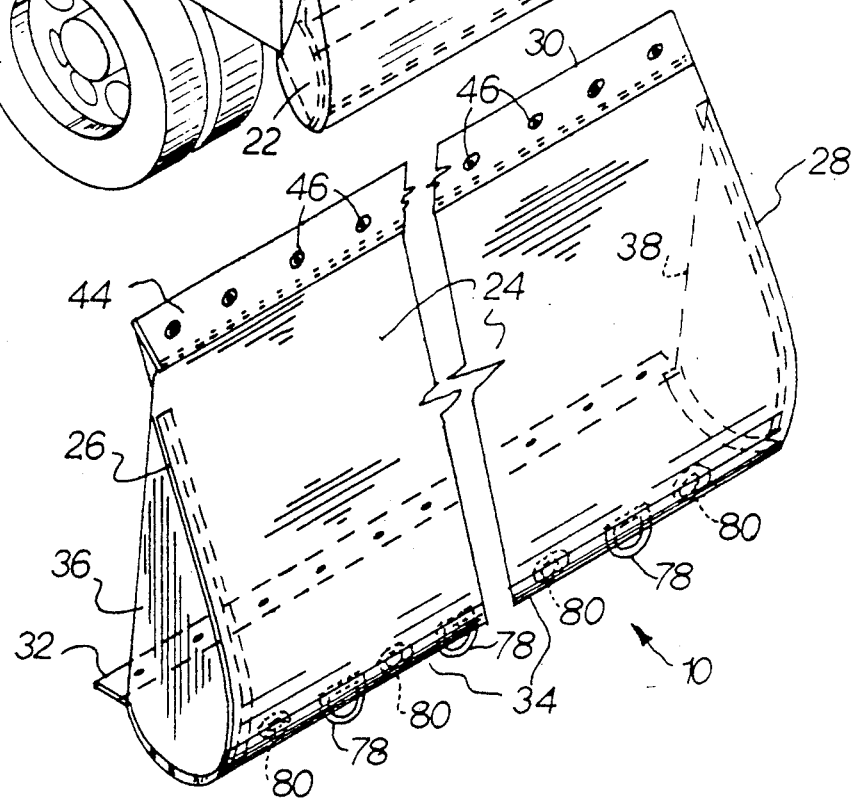
FIG. 2 is another perspective view of the debris catcher depicted in FIG. 1.

Referring now to the drawings there is shown a preferred embodiment of the debris catcher of this invention. The debris catcher is described in connection with a dump truck application to prevent as much as possible debris, rocks, stones, pebbles and the like from falling from a truck by providing a catching device for attachment to the rear of a truck or truck bed and is characterized by an improved catching, attaching and fastening structure in association with the exterior open portions of a truck bed.

The drawings show the debris catcher 10 in conjunction with a dump truck and conventional dumping bed or unit 12. A truck bed 14 supports the dump unit 12. A tail gate or dump gate 16 is typically connected to the dump unit 12 by a hinge. Thus, when the dump unit is activated, then the gate 16 swings open. It will be understood that dump truck designs and dimensions may vary. More importantly, it is known that after dumping or after being loaded debris can collect on the rear of the dump unit. More importantly, debris slip through the gate 16 and onto the pour plate 18.

Newer truck designs appear to be moving towards a unit with a pour plate 18. The pour plate usually has a base member 20 and side members 22. The purpose of the plate is to direct the load while it is being dumped. However, while the truck is moving between locations, the pour plate may only serve to direct the debris onto the roadway directly behind the truck and actually increase the proportion of debris spilled on the road surface.

What is required therefore is a collection means readily attached to the rear of the truck to collect these debris before they strike the roadway or, more importantly, a car or other vehicle traveling behind the truck.

It should be understood that the present invention is not believed to be capable of completely alleviating this problem and all of the broken windows and dented or scratched vehicle bodies. But nothing at all is known to exist at this time and it is believed that this invention will go along way towards making the roads relatively more safe than they are now from the potential damage these debris can cause.

The debris catcher 10 consists of a sheet member 24. It will be further understood that the attachment and detachable fastening of the sheet member 24 to the truck 12 results in the desired collection means or pebble, rock, and debris collection and retention portion 34. The sheet member 24 includes one side portion or edge 26, another side portion or edge 28, a top portion or edge 30, and a bottom portion or edge 32.

The sheet member 24 is made from a material suitable for withstanding the punishment of the weight of the debris and the jarring and bouncing of the truck. The sheet member is preferably a vinyl material with appropriately spaced side edges 26 and 28. The vinyl or other suitable material provides the debris catcher 10 with the desired flexibility to allow it to drop down out of the way when not fastened.

It will be further understood that each catcher 10 can be made with reinforced seams in either of side edges 26 or 28 which may tend to increase the strength of the catcher 10. Side members, pieces 36 and 38 provide for additional reinforcement of the sheet member as well as additional retention means for the collected debris.

Top edge 30 and bottom edge 32 reinforcement enhances the durability of the basic debris catcher embodiment. In a preferred enhanced embodiment, a metal reinforcing plate 40 fits into a pocket formed by a fold in the bottom edge 32 of the sheet member 24. Stitching is typically used to form the pocket in the vinyl material, although it will be understood that other suitable means, such as heat sealing are available.

The reinforcing plate, if used, includes one or bore bolt receiving holes 48 in registration with complementary openings 54 in the bottom edge 32 of the sheet member 24, including both sides of a pocket if used. It is expected that use of bolt receiving eye rings 42 in the bottom edge 32 will not depend upon the use of the reinforcing plate 40.

In another preferred enhanced embodiment, the top edge 30 includes a plurality of reinforcing layers 44 of the sheet material and including openings through the reinforcing layers for attaching the catcher to the truck bed. Stitching is typically used to form the multiple layers of the vinyl material, although it will be understood that other suitable means, such as heat sealing are available to provide suitable reinforcement of the multiple layer, or multi ply portion 44 of the top edge 40.

The top edge 30 includes one or more hook receiving holes 52 in registration with complementary openings in each layer of the top edge 30 of the sheet member 24, including each layer of the edge if this reinforcement is used. It is expected that use of hook receiving eye-rings 46 in the top edge 30 will not depend upon the use of the multi-ply construction of top edge 30.

A preferred embodiment of this invention will now be described in order to further clarify the invention and prepare for the following description of its operation. A preferred embodiment of the debris catcher 10 may be approximately seven feet and nine inches wide at the top edge 30 and approximately eight feet and one inches wide at the bottom edge 32. The top edge 30 is triple layered and stitched to provide the multi-ply, reinforced top edge portion 44. The reinforced portion of this embodiment may be approximately three (3) inches wide and could include eight (8) hook receiving eye-rings 46.

As previously mentioned, the top edge 30 is narrower than the bottom edge 32. In the preferred embodiment illustrated in the drawings the width of the sheet member 24 begins to taper approximately fourteen (14) inches from the top edge 30. The length varies to provide more or less debris collection volume within debris catcher 10 as desired.

The bottom edge 32 is folded over to form a pocket for receiving the metal reinforcing plate 40. The pocket is preferably formed by stitching the material of the sheet member 24. In a preferred embodiment the plate is approximately two inches wide, one eighth of an inch thick and approximately eight (8) feet long.

It will be understood that the illustrated arrangement of bolt receiving holes 48 suggests a six inch center to center spacing with a two inch gap between the centerline of the end openings 48 and the opposing side edges 26 and 28. The number, size, and spacing of the bolt receiving holes and the hook or fastener receiving holes will vary with the application, employment, operation, and use of this invention.

The side members 36 and 38, if applied, preferably extend from the top taper to the stitching of the pocket at the bottom edge 32, or if no pocket, then approximately two inches from the bottom edge, or at least far enough from the bottom edge so as not to interfere with attachment of the debris catcher 10 to the truck 12.

The debris catcher 10 is suspended from the rear of the vehicle as previously shown and described. The rearward facing surface becomes a location for advertising, similar to the fashion in which mud flaps often carry advertising for the manufacturer of the mud flaps, or other products or services of interest to the trucking, construction, and related industries.

An alternative support and attachment assembly is illustrated in FIGS. 9 through 11B in which a top edge portion 56 of the collection and retention portion 34 contains a pocket or other bar support means for a bar 58. The bar 58 may be a steel tube or manufactured from bar stock or another equivalent component. The support means provides a locking means or mechanism 60 at one end and a support means or assembly 62 at the opposing end.

Any suitable locking mechanism may be provided. In a preferred embodiment the locking mechanism 60 the tube or bar 58 defines a slot or opening 64 for receiving a hasp 66 or other equivalent locking mechanism. A hasp support plate 63 is attached to the lift gate 16 by support bolts 70.

Figure 11A:
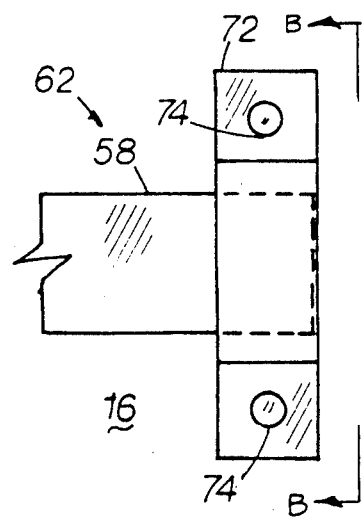
FIGS. 11A and 11B are partial elevation views of the closure system also illustrated in FIGS. 9 and 10.
Figure 11B:
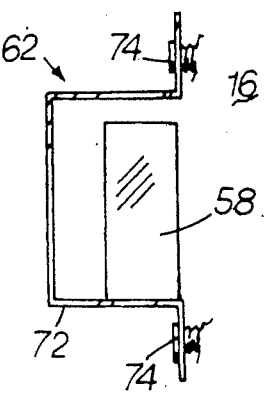

The supporting mechanism receiving the opposite end of the tube or bar 58 may be a U-shaped support member 72 as depicted in FIGS. 11A and 11B. The bar 58 at end 62 slides in and out of member 72. Support fasteners 74 are shown to illustrate one fashion of attaching member 72 to lift gate 16.

The arrangement thus described allows the debris catcher of this invention to be removed from the dump or lift gate 16 without the need to lift the catcher which may be full of debris. It is suggested that the alternative attachment assembly just described may be particularly suitable for installation on larger trucks.

In operation, in connection with the application of a preferred embodiment of the present invention to a dump truck previously mentioned, the debris catcher is assembled as described. The bottom edge 32 is attached to the underside of the truck body 12 at the rear of the dump unit. An appropriate number of suitably sized bolts is used. This attachment is intended to be relatively permanent. Hooks or other fasteners are attached to the tail gate 16.

Other fasteners may be used so long as the top edge 30 of the debris catcher is provided with a fastener system or assembly that can be detached. Snaps or compressible post or another suitable arrangement may be used for receiving the eye rings 46. It will be understood that fastening and attachment means may vary to suit the application or use of this invention.

When the dump unit is in use or the tail gate is moved the debris catcher 10 is only attached to the truck 12 at the bottom edge 32. Prior to moving the truck the top edge 30 is attached to the tailgate 16. In this manner the debris catcher provides collection portion 34 for any stones, rocks, pebbles, or other debris that would otherwise fall from the rear of the truck and onto the road behind the truck and possibly into the oath of a following vehicle and damage the body or windshield of the following vehicle.

Figure 12:
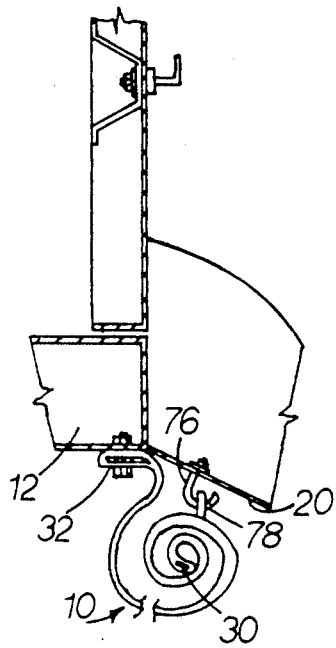
FIG. 12 is a side elevation view of the debris catcher stowed away under a dump truck pour plate.
Figure 9:
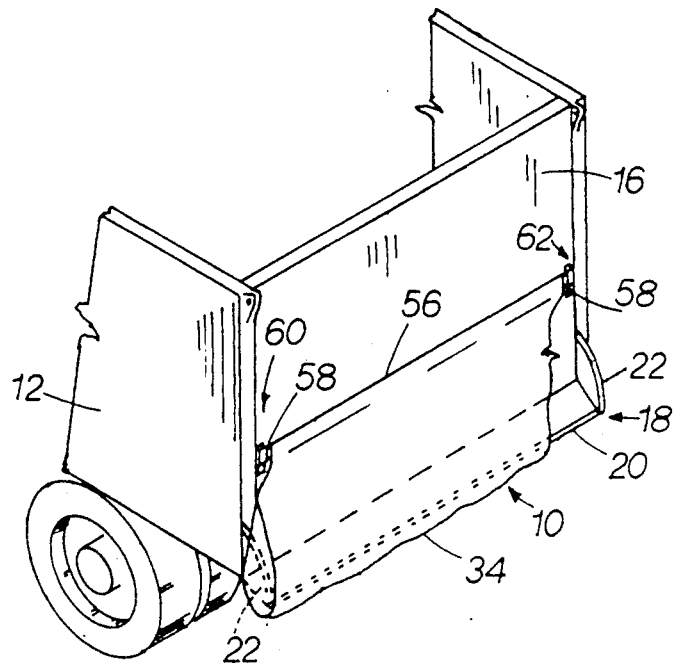
FIG. 9 is an elevation view of another embodiment of the debris catcher of this invention.
Figure 10:
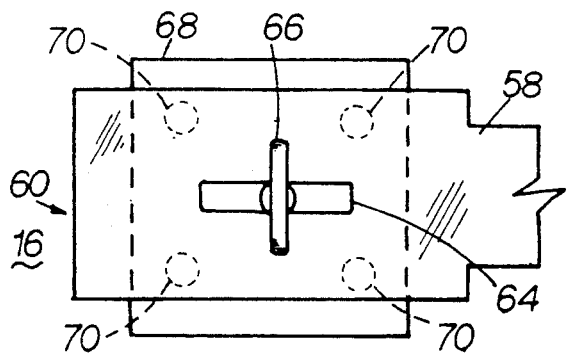
FIG. 10 is a partial elevation view of a closure system of the embodiment depicted in FIG. 9.

When not in use the debris catcher 10 may be supported out of the way of truck operation in the fashion illustrated in FIG. 12. Hooks 76 (only one is illustrated in the elevation) are attached to some lower surface, such as the bottom of the pour plate 18. If the debris catcher should need to be stowed without complete removal, then it can be rolled up and hung on the hooks 76 by means of D-rings 78.

From the foregoing description those skilled in the art will appreciate that all objects of the present invention are realized. A debris catcher has been shown and described for providing the desired prevention of debris, rocks, stones, pebbles and the like from falling from a truck and possibly creating an unsafe road condition for following vehicles. The present invention provides a catching device for attachment to the rear of a truck.

The debris catcher of this invention improves upon the conventional tarp and diverters found on trucks and particularly dump trucks. Two specific attachment systems are illustrated and described for attaching the debris catcher to the rear of a truck. In the depicted embodiments. stones, pebbles, and other debris remaining on a rear portion of the truck bed or slipping through the tail gate will be captured and kept from falling onto the road surface.

The alternative embodiments shown and described illustrate that a standardized design has been provided for use on a variety of truck and truck bed designs. Alternative attachment assemblies have been depicted for allowing the debris catcher to be unfastened from the truck bed and the collected debris allowed to spill out.

While specific embodiments have been shown and described, many variations are possible. The particular shape of the debris catcher including dimensions may be changed as desired to suit the equipment with which it is used. The sheet member material may vary although a heavy duty vinyl is preferred. The sheet member may be a heavy duty canvas or other suitable material. The sheet member may be a combination of materials, for example, canvas at top, bottom, and sides with a central portion of vinyl, suitable plastic or fiberglass material.

The reinforcing plate material may vary although metal stock is preferred. The reinforcing of the edges may be accomplished in other ways then those disclosed. If the vehicle to which this invention is applied has a pour plate, then the bottom edge 32 may be attached to the pour plate base 20. Metal eye rings are preferred, however, other materials such as a suitably durable plastic may be used.

The addition of a grommet or grommets 80 provides for drainage of the collector portion, thereby reducing the weight carried by the catcher and the mess associated with the emptying of the catcher.

Having described the invention in detail, those skilled in the art will appreciate that modifications may be made of the invention without departing from its spirit. Therefore, it is not intended that the scope of the invention be limited to the specific embodiments illustrated and described. Rather, it is intended that the scope of this invention be determined by the appended claims and their equivalents.

What is claimed is:

1. A debris catcher which is suspended from and attached to the rear of a truck bed, for catching or collecting debris from the rear of a truck bed, comprising:

means for collecting debris, the collecting means being inherently flexible;

means for attaching collecting means to a vehicle in order to collect debris from the vehicle; and means for fastening collecting means to the vehicle, whereby attaching and fastening means cooperate to connect the collection means to the vehicle.

2. A debris catcher as set forth in claim 1 wherein collecting means includes side members intended to further confine any debris within the collecting means.

3. A debris catcher as set forth in claim 1 wherein attaching means includes means for reinforcing the catcher where it is attached to the vehicle.

4. A debris catcher as set forth in claim 1 wherein the fastening means includes means for reinforcing the catcher where it is fastened to the vehicle.

5. A debris catcher as set forth in claim 1 wherein the fastening means operation is not substantially hindered by the weight of debris contained in collecting means.

6. A debris catcher as set forth in claim 1 further comprising means for rolling up and storing collecting means.

7. A debris catcher for catching or collecting debris from the rear of a truck, comprising:

a generally flexible sheet member including opposing side portions, a top portion, a bottom portion;

attachment means defined by the bottom portion for attaching the sheet member to the truck bed; and fastening means defined by the top portion for providing a detachable fastening assembly, whereby attachment means and fastening means cooperate to connect the generally flexible sheet member to the rear of the truck.

8. A debris catcher as set forth in claim 8 wherein the bottom portion includes means for reinforcing the catcher where it is attached to the vehicle.

9. A debris catcher as set forth in claim 8 wherein the reinforcing means includes a metal member carried by the bottom portion of the sheet member.

10. A debris catcher as set forth in claim 9 wherein the top portion includes means for reinforcing the catcher where it provides the detachable fastener.

11. A debris catcher as set forth in claim 10 wherein the reinforcing means includes the bottom portion of the sheet member formed into a plurality a layers.

12. A debris catcher as set forth in claim 10 including at least two opposing side members attached to respective opposing side portions.

13. A debris catcher as set forth in claim 7 further comprising means for rolling up and storing the generally flexible sheet member.

14. A debris catcher for catching or collecting debris from the rear of a truck bed, comprising:

a sheet member including opposing side edges, a top edge, a bottom edge;

the bottom edge including reinforcing means and openings through the reinforcing means for attaching the catcher to the truck bed; and the top edge including a plurality of reinforcing layers of the sheet material and including openings through the reinforcing layers for attaching the catcher to the truck bed.

15. A debris catcher as set forth in claim 14 including at least two opposing side members attached to respective opposing side edges.

16. A debris catcher as set forth in claim 14 wherein the bottom edge reinforcing means includes a metal member sewn into a pocket formed by a fold in the bottom edge of the sheet member.

17. A debris catcher as set forth in claim 14 wherein bottom edge openings are defined by at least one bottom edge eye-ring.

18. A debris catcher as set forth in claim 8 wherein top edge openings are defined by at least one top edge eye-ring.

* * * * *